UNITED STATES PATENT OFFICE.

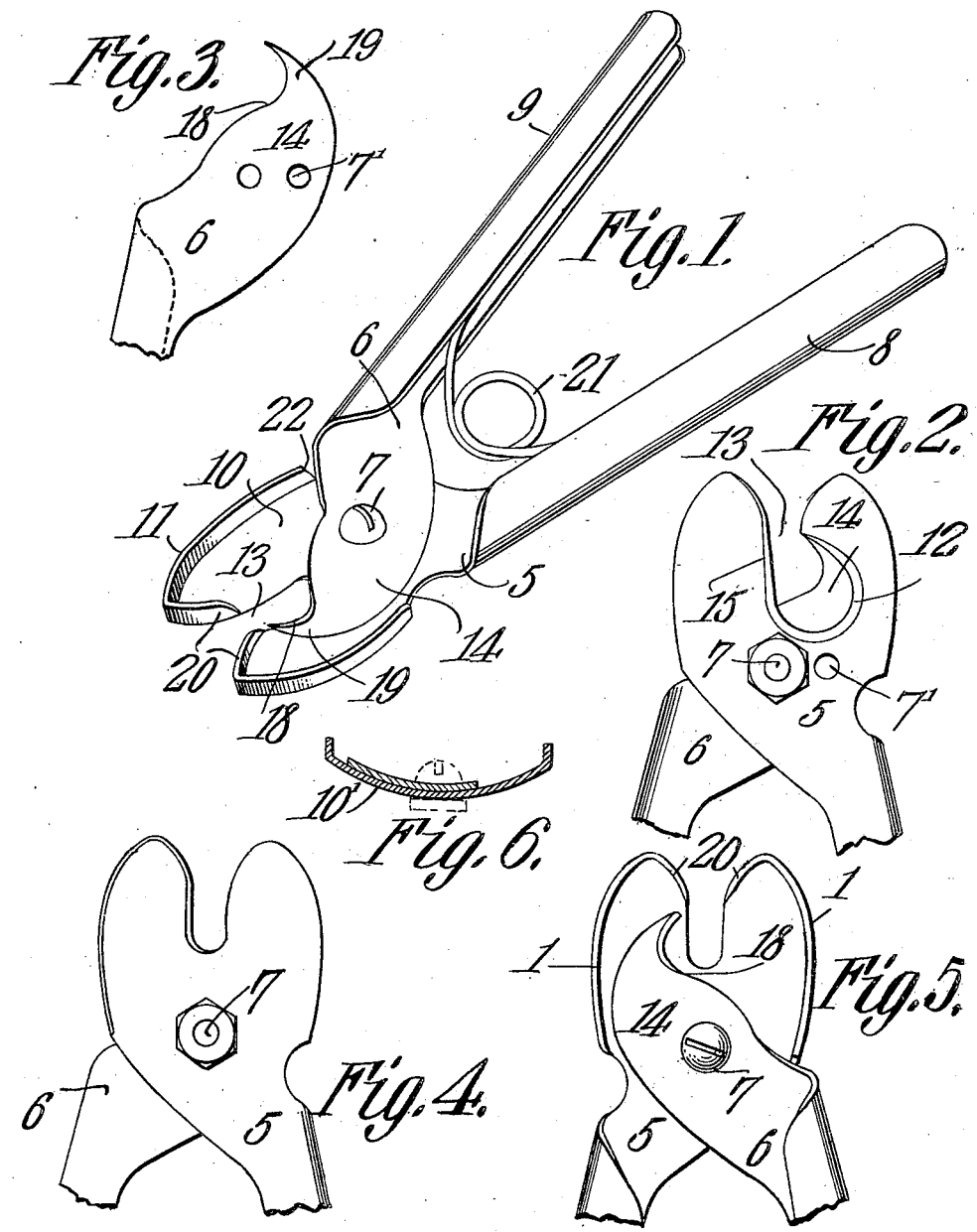

JONATHAN B. TUTTLE, OF CLAREMONT, CALIFORNIA.

FRUIT AND FLOWER PICKER.

No. 886,555.  Specification of Letters Patent.  Patented May 5, 1908.

Application filed September 30, 1907. Serial No. 395,268.

*To all whom it may concern:*

Be it known that I, JONATHAN B. TUTTLE, a citizen of the United States, residing at Claremont, in the county of Los Angeles and State of California, have invented a new and useful Fruit and Flower Picker, of which the following is a specification.

This invention relates to fruit pickers and has for its object to provide a comparatively simple and inexpensive device of this character by means of which oranges, lemons and other fruit may be cut or severed from the stems without danger of puncturing or otherwise cutting or bruising the fruit.

A further object of the invention is to provide a clipper having a pivoted knife one end of which is curved laterally to form a hook adapted to engage and sever the stem of the fruit.

A further object is to form the relatively stationary member with a semi-circular recess the walls of which are inclined or beveled to produce a cutting edge which coöperates with the cutting edge of a movable member thereby to permit the clipper to be used for cutting or trimming plants, flowers and the like.

A further object is to provide means for guiding the stems to the cutting knife, and means for housing the knife so as to prevent the same from injuring the fruit during the cutting operation.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a perspective view of a fruit clipper constructed in accordance with my invention. Fig. 2 is a rear elevation of the same. Fig. 3 is a rear elevation of the movable member or knife. Fig. 4 is a rear elevation illustrating a modified form of the invention. Fig. 5 is a front elevation of Fig. 4. Fig. 6 is a transverse sectional view illustrating a further modification.

Similar numerals of reference indicate corresponding parts in all of the figures of the drawings.

The improved clippers forming the subject matter of the present invention includes a relatively stationary member 5 and a movable member 6, said members being pivotally united at 7 and provided with terminal operating handles 8 and 9.

The members 5 and 6 are each preferably stamped or otherwise formed from a single piece of metal, one of said members being provided with a flat head 10 having marginal reinforcing flanges 11 which not only serves to strengthen the member 5 but also serves to assist in preventing injury to the fruit when the clippers are in use. The head 10 is formed with a substantially semi-circular recess 12 having a contracted throat 13 opening through one end of the head 10 and through which the stems of the fruit are guided to the cutting blade 14 of the movable member 6. The walls of the recess 12 and throat 13 are inclined or beveled to form a cutting edge 15 which co-acts with the cutting edge 18 formed on the curved or hooked end 19 of the pivoted knife 14 so that the clippers may be used for cutting or trimming plants, flowers and the like. The side walls of the throat or slot 13 are inclined or beveled in opposite directions and are provided with vertical flanges 20 preferably formed integral with the flanges 11 and which serve the dual function of guiding the stems of the fruit to the cutting blade 18 and also to prevent mutilating of the fruit when positioning the clipper on the latter.

Attention is here called to the fact that the cutting blade 14 of the movable member 6 is pivotally mounted on the head 10 and is effectually housed by the flanges 11 and 20 thus preventing the several cutting edges as well as the bill of the hook from coming in contact with the fruit and puncturing or bruising the latter during the cutting operation.

The cutting parts as well as the handles of members 5 and 6 may be of sheet metal as shown or may be formed of forged or cut steel. As a means for normally and yieldably supporting the handles in spaced relation there is provided a spring having its intermediate portion bent to form a coil 21 while its opposite ends are seated within the longitudinal grooves of the operating handles, as shown. If preferred any other suitable form of spring may be employed. Attention is called to the fact that the lateral opening movement of the operating handles 8 and 9 is limited by engagement of the member 6 with the stop shoulder 22 formed by the adjacent end of the reinforcing flange 11.

In using the device for picking oranges, lemons and similar fruit the clipper is positioned on the fruit with the stem extending within the throat or slot 13 after which the handles 8 and 9 are brought together which causes the cutting edge 18 of the blade 14 to engage the stem and cut or sever the latter, as will be readily understood.

It will be here noted that by having the cutting edge 18 concave in outline when the operating handles are pressed together, said cutting edge will engage and positively force the stem in contact with the cutting edge 15 of the throat 13 thus effectually preventing the slipping out of the stem from the throat or slot during the cutting operation. The cutting edge 18 may also be made with less curvature or even straight.

In using the device for trimming or pruning purposes the stems of the flowers are introduced between the cutting edge 18 of the movable member or blade and the cutting edge 15 and the handles 8 and 9 operated in the usual manner.

The recess 12 is designed to facilitate the cutting of the stem close to the fruit but in Figs. 4 and 5 of the drawings there is illustrated a modified form of the invention in which the semi-circular recess 12 is dispensed with, the construction being otherwise similar to that shown in Fig. 1 of the drawings. If desired, the head of the stationary member as well as the blade 14 may be slightly convex, as illustrated at 10' in Fig. 6 so as to permit the stems to be cut or severed at any desired distance from the fruit.

In the construction of this clipper the position of the pivot 7 may be varied so that in the cutting of the stem the point of the cutting edge 18 may be drawn more or less downward or towards the operator according as the pivot 7 is placed a little more to the right and upward as shown on Figs. 2 and 3 by number 7'.

From the foregoing description it will be seen that there is provided an extremely simple, inexpensive and efficient device admirably adapted for the attainment of the ends in view.

What is claimed is:

1. A fruit clipper including a relatively stationary member having a substantially semi-circular recess formed therein and opening through one end of the member to form a contracted slot, the walls of the recess and slot being provided with cutting edges, and a movable member pivotally mounted on the stationary member and provided with a terminal hook having a concaved cutting edge co-acting with the cutting edge of the slot.

2. A fruit clipper including a relatively stationary member having an elongated slot formed therein and provided with marginal reinforcing flanges inclined in the direction of the slot and forming a portion of the walls of the latter, one of the walls of said slot adjacent the flange being formed with a cutting edge, and a movable member pivotally mounted on the stationary member and provided with a terminal hook or blade having a concaved cutting edge co-acting with the cutting edge of the slot, the pivoted end of the movable member being housed by the marginal flanges.

3. A fruit clipper including pivotally united members one of which is provided with an elongated slot having one wall thereof formed with a cutting edge, the mating member being provided with a terminal blade co-acting with said cutting edge and flanges on the marginal edge of the slotted member and extending inwardly at said slot to form a portion of the walls thereof.

4. A fruit clipper including pivotally united members one of which is provided with an elongated slot having one wall thereof formed with a cutting edge, the mating member being provided with a terminal blade having a concaved cutting edge co-acting with the cutting edge of the slot, and flanges extending laterally from the marginal edge of the slotted member and projecting inwardly at said slot to form a portion of the walls thereof.

5. A fruit clipper including pivotally united members one of which is provided with a flat bearing surface having an elongated slot formed therein one wall of which is provided with a cutting edge, the mating member being provided with a terminal blade mounted for pivotal movement on the flat bearing surface and co-acting with the cutting edge, and flanges extending laterally from the marginal edge of the slotted member and extending inwardly at and conforming to the walls of the slot.

6. A fruit clipper including pivotally united members one of which is provided with an elongated slot having one wall thereof formed with a cutting edge, the mating member being provided with a terminal blade co-acting with said cutting edge, flanges extending laterally from the marginal edge of the slotted member and curved inwardly to conform to the walls of the slot, said members being provided with handles having longitudinal grooves formed therein, and a spring interposed between the handles and seated in said grooves.

In testimony that I claim the foregoing as my own, I have hereto affixed my signature in the presence of two witnesses.

JONATHAN B. TUTTLE.

Witnesses:
 ROBERT B. CHISHOLM, Jr.,
 W. N. BEACH.